(12) United States Patent
Hattori et al.

(10) Patent No.: US 11,891,549 B2
(45) Date of Patent: *Feb. 6, 2024

(54) DOUBLE-SIDED ADHESIVE LAYER-EQUIPPED OPTICAL LAMINATE

(71) Applicant: NITTO DENKO CORPORATION, Ibaraki (JP)

(72) Inventors: Daisuke Hattori, Ibaraki (JP); Atsushi Kishi, Ibaraki (JP); Ryota Morishima, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 298 days.

This patent is subject to a terminal disclaimer.

(21) Appl. No.: 17/276,962

(22) PCT Filed: Sep. 26, 2019

(86) PCT No.: PCT/JP2019/037976
§ 371 (c)(1),
(2) Date: Mar. 17, 2021

(87) PCT Pub. No.: WO2020/067344
PCT Pub. Date: Apr. 2, 2020

(65) Prior Publication Data
US 2022/0033687 A1 Feb. 3, 2022

(30) Foreign Application Priority Data
Sep. 28, 2018 (JP) .................................. 2018-184834

(51) Int. Cl.
*C09J 7/29* (2018.01)
*C09J 7/38* (2018.01)
(Continued)

(52) U.S. Cl.
CPC ................. *C09J 7/29* (2018.01); *C09J 7/385* (2018.01); *G02B 1/11* (2013.01);
(Continued)

(58) Field of Classification Search
None
See application file for complete search history.

(56) References Cited

U.S. PATENT DOCUMENTS 7,255,920 B2  8/2007 Everaerts et al.
10,114,168 B2 10/2018 Wong
(Continued)

FOREIGN PATENT DOCUMENTS

CN   101805566 A   7/2006
CN   104854488 A   8/2015
(Continued)

OTHER PUBLICATIONS

Furukawa, Satoshi et al., "Tackifying Adhesive Sheet, Article, and Method for Manufacturing Article and Image Display Device", machine translation of JP 2015224320 A, Dec. 14, 2015 (Year: 2015).*

(Continued)

*Primary Examiner* — Anish P Desai
(74) *Attorney, Agent, or Firm* — WHDA, LLP (57) ABSTRACT

There is provided an optical laminate with pressure-sensitive adhesive layers on both surfaces, which is suppressed damage from occurring to a low-refractive index layer in vacuum lamination while maintaining excellent characteristics of the low-refractive index layer. An optical laminate with pressure-sensitive adhesive layers on both surfaces according to an embodiment of the present invention comprises: a substrate; a low-retractive index layer formed on the substrate; a first pressure-sensitive adhesive layer arranged so as to be adjacent to the low-refractive index (Continued)

layer; and a second pressure-sensitive adhesive layer serving as one outermost layer. The low-refractive index layer has a porosity of 50% or more, the first pressure-sensitive adhesive layer has a storage modulus of elasticity of from $1.3 \times 10^5$ (Pa) to $1.0 \times 10^7$ (Pa), and the second pressure-sensitive adhesive layer has a storage modulus of elasticity of $1.0 \times 10^5$ (Pa) or less.

5 Claims, 1 Drawing Sheet

(51) Int. Cl.
    *G02B 1/11*     (2015.01)
    *G02B 1/14*     (2015.01)

(52) U.S. Cl.
    CPC ........... *C09J 2301/124* (2020.08); *G02B 1/14* (2015.01); *G02B 2207/107* (2013.01); *Y10T 428/249982* (2015.04); *Y10T 428/2848* (2015.01)

(56) References Cited

U.S. PATENT DOCUMENTS

| | | | |
|---|---|---|---|
| 10,310,333 | B2 | 6/2019 | Yasui et al. |
| 10,472,483 | B2 | 11/2019 | Haruta et al. |
| 10,815,355 | B2 | 10/2020 | Haruta et al. |
| 2010/0209703 | A1 | 8/2010 | Takarada et al. |
| 2011/0033662 | A1* | 2/2011 | Ikishima ............... B32B 27/304 428/141 |
| 2011/0176325 | A1 | 7/2011 | Sherman et al. |
| 2013/0235614 | A1* | 9/2013 | Wolk ................... G02B 6/0066 362/606 |
| 2014/0133177 | A1 | 5/2014 | Miller et al. |
| 2015/0346408 | A1 | 12/2015 | Mizutani et al. |
| 2017/0307805 | A1 | 10/2017 | Wong |
| 2017/0341336 | A1 | 11/2017 | Haruta et al. |
| 2017/0342232 | A1 | 11/2017 | Haruta et al. |
| 2018/0002508 | A1 | 1/2018 | Hattori et al. |
| 2018/0157125 | A1 | 6/2018 | Yasui et al. |
| 2019/0330438 | A1 | 10/2019 | Haruta et al. |
| 2020/0224059 | A1* | 7/2020 | Hattori ..................... C08J 9/009 |
| 2020/0247089 | A1 | 8/2020 | Hattori et al. |

FOREIGN PATENT DOCUMENTS

| | | | |
|---|---|---|---|
| CN | 107148350 | A | 9/2017 |
| CN | 206975244 | U | 2/2018 |
| CN | 108398741 | A | 8/2018 |
| CN | 108474891 | A | 8/2018 |
| EP | 2169024 | A1 | 3/2010 |
| JP | 10-62626 | A | 3/1998 |
| JP | 2001-234129 | A | 8/2001 |
| JP | 2004-292493 | A | 10/2004 |
| JP | 2005-105228 | A | 4/2005 |
| JP | 2005-215050 | A | 8/2005 |
| JP | 2009-294602 | A | 12/2009 |
| JP | 2011-157554 | A | 8/2011 |
| JP | 2014-125524 | A | 7/2014 |
| JP | 2015224320 | A * | 12/2015 |
| JP | 2018-123299 | A | 8/2018 |
| KR | 20180018503 | A | 2/2018 |
| TW | 201800528 | A | 1/2018 |
| WO | 2010/005655 | A2 | 1/2010 |
| WO | 2017/134754 | A1 | 8/2017 |
| WO | 2017/188223 | A1 | 11/2017 |
| WO | 2018/142813 | A1 | 8/2018 |

OTHER PUBLICATIONS

Hattori, Daisuke et al., Low Refractive Index Layer Containing Adhesive Sheet, Method for Producing Low Refractive Index Layer Containing Adhesive Sheet, and Optical Device, machine translation of WO 2018142813 A1, Aug. 9, 2018 (Year: 2018).*
ASTM D4065-20, "Standard Practive for Plastics: Dynamic Mechanical Properties: Determination and Report of Procedures", retrived on Sep. 9, 2023 (Year: 2023).*
Office Action dated Jan. 19, 2023, issued in counterpart KR application No. 10-2021-7007892, with English translation. (8 pages).
Chinese Office Action dated Nov. 16, 2022, issued in counterpart CN patent application No. 201980063551.3; with English machine translation thereof.
International Search Report dated Dec. 10, 2019, issued in counterpart International Application No. PCT/JP2019/037976 (2 pages).
Office Action dated Jul. 25, 2022, issued in counterpart KR patent application No. 10-2021-7007892, with English machine translation. (8 pages).
Extended European search report dated Jun. 13, 2022, issued in counterpart EP application No. 19867798.1. (6 pages).
Office Action dated Jan. 26, 2022, issued in counterpart to CN application No. 201980063551.3 with English machine translation. (15 pages).
International Search Report dated Dec. 10, 2019, issued in International Application No. PCT/JP2019/037977 (counterpart to U.S. Appl. No. 17/276,946). (2 pages).
Office Action dated Mar. 2, 2022, issued in CN application No. 201980063992.3 (counterpart to U.S. Appl. No. 17/276,946), with English machine translation. (15 pages).
The Extended European search report dated Jun. 13, 2022, issued in EP application No. 19865377.6 (counterpart to U.S. Appl. No. 17/276,946). (6 pages).
Non-Final Office Action dated Jan. 20, 2023, issued in U.S. Appl. No. 17/276,946. (26 pages).
Wolk et al., "Mircostructured Low Refractive Index Viscoelastic Articles", 2010, U.S. Appl. No. 61/294,610, cited in Non-Final Office Action dated Jan. 20, 2023.
Office Action dated Apr. 25, 2023, issued in counterpart KR Application No. 10-2021-7007892, with English translation. (13 pages).

* cited by examiner

DOUBLE-SIDED ADHESIVE LAYER-EQUIPPED OPTICAL LAMINATE

TECHNICAL FIELD

The present invention relates to an optical laminate with pressure-sensitive adhesive layers on both surfaces.

BACKGROUND ART

In the lamination of a light guide plate and a peripheral optical member e.g., a reflective plate, a diffusing plate, a prism sheet, or a light extraction film) in an optical apparatus configured to extract light with the light guide plate (e.g., an image display apparatus or a lighting apparatus), a technology including performing the lamination via a low-refractive index layer has been known. It has been reported that according to such technology, the intermediation of the low-refractive index layer improves light utilization efficiency as compared to that in the case where the lamination is simply performed with a pressure-sensitive adhesive alone. Incidentally, depending on the configuration of the light guide plate and/or the peripheral optical member, vacuum lamination in which the light guide plate and the peripheral optical member are laminated in a vacuum may be adopted. In the vacuum Lamination, however, the low-refractive index layer may be damaged.

CITATION LIST

Patent Literature

[PTL 1] JP 10-62626 A

SUMMARY OF INVENTION

Technical Problem

The present invention has been made to solve the above-mentioned conventional problem/and a primary object of the present invention is to provide an optical laminate with pressure-sensitive adhesive layers on both surfaces, which is suppressed damage from occurring to a low-refractive index layer in vacuum lamination while maintaining excellent characteristics of the low-refractive index layer.

Solution to Problem

An optical laminate with pressure-sensitive adhesive layers on both surfaces according to an embodiment of the present invention comprises: a substrate; a low-refractive index layer formed on the substrate; a first pressure-sensitive adhesive layer arranged so as to be adjacent to the low-refractive index layer; and a second pressure-sensitive adhesive layer serving as one outermost layer. The low-refractive index layer has a porosity of 50% or more, the first pressure-sensitive adhesive layer has a storage modulus of elasticity of from $1.3 \times 10^5$ (Pa) to $1.0 \times 10^7$ (Pa), and the second pressure-sensitive adhesive layer has a storage modulus of elasticity of $1.0 \times 10^5$ (Pa) or less. In one embodiment of the present invention, the second pressure-sensitive adhesive layer is arranged on a side of the substrate opposite to the low-retractive index layer so that the first pressure-sensitive adhesive layer and the second pressure-sensitive adhesive layer serve as outermost layers.

In one embodiment of the present invention, the optical laminate further comprises a third pressure-sensitive adhesive layer, wherein the second pressure-sensitive adhesive layer is arranged outside the first pressure-sensitive adhesive layer, and the third pressure-sensitive adhesive layer is arranged on a side of the substrate opposite to the low-refractive index layer so that the second pressure-sensitive adhesive layer and the third pressure-sensitive adhesive layer serve as outermost layers.

In one embodiment of the present invention, the third pressure-sensitive adhesive layer has a storage modulus of elasticity of $1.0 \times 10^5$ (Pa) or less.

In one embodiment of the present invention, the third pressure-sensitive adhesive layer has a storage modulus of elasticity of $1.3 \times 10^5$ (Pa) or more.

In one embodiment of the present invention, the low-refractive index layer has a refractive index of from 1.01 to 1.30.

Effects of Invention

According to the present invention, in the optical laminate with pressure-sensitive adhesive layers on both surfaces including the low-refractive index layer having a high porosity, the storage modulus of elasticity of the pressure-sensitive adhesive layer adjacent to the low-refractive index layer is set to a predetermined value or more, and the storage modulus of elasticity of at least one of the pressure-sensitive adhesive layers serving as outermost layers is set to a predetermined value or less. Accordingly, damage to the low-refractive index layer in vacuum lamination can be suppressed while excellent characteristics of the low-refractive index layer are maintained.

DESCRIPTION OF EMBODIMENTS

Embodiments of the present invention are described below. However/the present invention is not limited to these embodiments.

Figure 1:
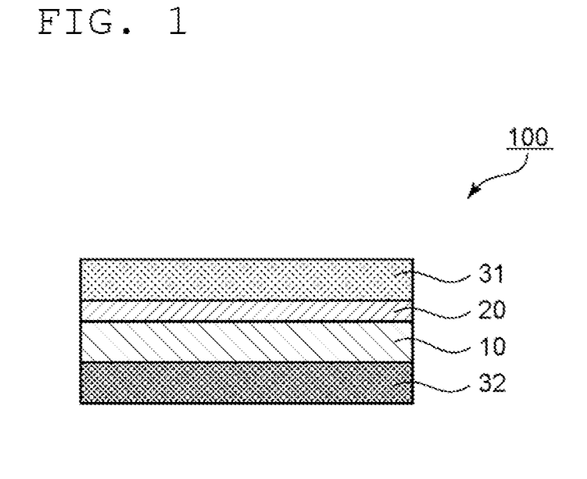
FIG. 1 is a schematic sectional view of an optical laminate with pressure-sensitive adhesive layers on both surfaces according to one embodiment of the present invention.

A. Overall Configuration of Optical Laminate with Pressure-Sensitive Adhesive Layers on Both Surfaces FIG. 1 is a schematic sectional view of an optical laminate with pressure-sensitive adhesive layers on both surfaces according to one embodiment of the present invention. An optical laminate 100 with pressure-sensitive adhesive layers on both surfaces of this embodiment includes: a substrate 10; a low-refractive index layer 20 formed on the substrate 10; a first pressure-sensitive adhesive layer 31 arranged so as to be adjacent to the low-refractive index layer 20; and a second pressure-sensitive adhesive layer 32. In the embodiment of the present invention, the second pressure-sensitive adhesive layer 32 serves as one outermost layer. In the illustrated example, the second pressure-sensitive adhesive layer 32 is arranged on the side of the substrate 10 opposite to the low-refractive index layer 20 so that the first pressure-sensitive adhesive layer 31 and the second pressure-sensitive adhesive layer 32 serve as outermost layers. In the embodiment of the present invention, the low-refractive index layer 20 has a porosity of 50% or more. Although the low-refractive index layer having a high porosity as described above is liable to be damaged in vacuum lamination, according to the embodiment of the present invention, even such low-refractive index layer can be suppressed from being damaged in the vacuum lamination. Further, in the embodiment of the present invention, the first pressure-sensitive adhesive layer has a storage modulus of elasticity of from $1.3 \times 10^5$ (Pa) to $1.0 \times 10^7$ (Pa), and the second pressure-sensitive adhesive layer has a storage modulus of elasticity of $1.0 \times 10^5$ (Pa) or less. When the storage modulus of elasticity of the second pressure-sensitive adhesive layer serving as one outermost layer is set to a low value as described above, damage to the low-refractive index layer in the vacuum lamination can be suppressed. Further, when the storage modulus of elasticity of the first pressure-sensitive adhesive layer adjacent to the low-refractive index layer is set to a high value as described above, its pressure-sensitive adhesive can be prevented from entering the pores of the low-retractive index layer. Accordingly, the refractive index of the low-refractive index layer is maintained at a low value, and hence its effect can be maintained. That is, according to the embodiment of the present invention, the first pressure-sensitive adhesive layer that has a high storage modulus of elasticity equal to or more than a predetermined value (i.e., is hard) is arranged so as to foe adjacent to the low-refractive index layer, and the second pressure-sensitive adhesive layer that has a low storage modulus of elasticity equal to or less than a predetermined value (i.e., is soft) serves as an outermost layer, and hence the damage to the low-refractive index layer in the vacuum lamination can be suppressed while excellent characteristics of the low-refractive index layer are maintained.

Figure 2:
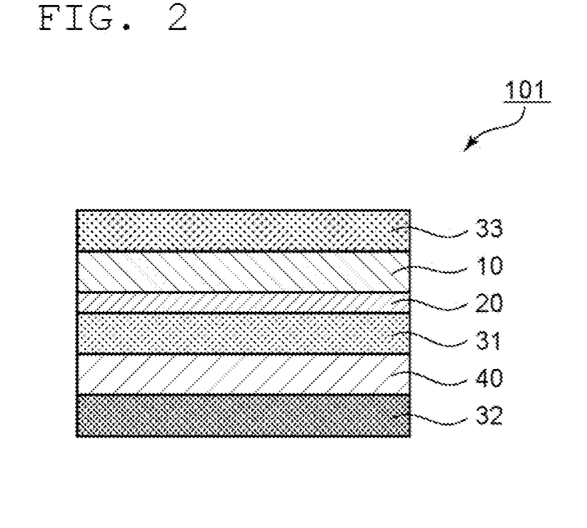
FIG. 2 is a schematic sectional view of an optical laminate with pressure-sensitive adhesive layers on both surfaces according to another embodiment of the present invention.

FIG. 2 is a schematic sectional view of an optical laminate with pressure-sensitive adhesive layers on both surfaces according to another embodiment of the present invention. An optical laminate 101 with pressure-sensitive adhesive layers on both surfaces of this embodiment includes the second pressure-sensitive adhesive layer as an outermost layer on the low-refractive index layer 20 side. That is, according to the illustrated example, the second pressure-sensitive adhesive layer 32 is arranged outside the first pressure-sensitive adhesive layer 31, and a third pressure-sensitive adhesive layer 33 is further arranged on the side of the substrate 10 opposite to the low-refractive index layer 20 so that the second pressure-sensitive adhesive layer 32 and the third pressure-sensitive adhesive layer 33 serve as outermost layers. In this case, a protective layer 40 may be preferably arranged between the first pressure-sensitive adhesive layer 31 and the second pressure-sensitive adhesive layer 32 like the illustrated example. The arrangement of the protective layer further imparts the strain-alleviating property of the protective layer itself to the optical laminate, and hence can more satisfactorily suppress the damage from being occurred to the low-refractive index layer in the vacuum lamination. In the illustrated example, the storage modulus of elasticity of the third pressure-sensitive adhesive layer 33 may be $1.0 \times 10^5$ (Pa) or less (the layer may be soft), or may be $1.3 \times 10^5$ (Pa) or more (the layer may be hard).

Practically, separators (not shown) are temporarily bonded to the surfaces of the pressure-sensitive adhesive layers serving as the outermost layers on both sides of the optical laminate in a peelable manner to protect the pressure-sensitive adhesive layers until the layers are brought into use, and to enable the formation of a roll.

The optical laminate with pressure-sensitive adhesive layers on both surfaces according to the embodiment of the present invention is typically used in the lamination of a light guide plate and a peripheral member, and may be used particularly in lamination requiring the vacuum lamination. In the optical laminate with pressure-sensitive adhesive layers on both surfaces, the second pressure-sensitive adhesive layer 32 that is soft may be arranged on a light guide plate side, or may be arranged on a side opposite to the light guide plate (peripheral member side).

The light guide plate to which the present invention may be suitably applied is typically, for example, a rigid light guide plate (e.g., a thick light guide plate or a glass light guide plate. The peripheral member to be laminated with the light guide plate is also preferably rigid. The peripheral member is specifically, for example, a reflective plate, a diffusing plate, a prism sheet, an image display cell, or an image display panel.

The constituents of the optical laminate with pressure-sensitive adhesive layers on both surfaces are specifically described below.

B. Substrate

The substrate 10 may be typically formed of a film or plate-shaped product of a resin (preferably a transparent resin) Typical examples of such resin include a thermoplastic resin and a reactive resin (e.g., an ionizing radiation-curable resin. Specific examples of the thermoplastic resin include: (meth)acrylic resins, such as polymethyl methacrylate (PMMA) and polyacrylonitrile; polycarbonate (PC) resins; polyester resins, such as PET; cellulose-based resins, such as triacetyl cellulose (TAC); cyclic polyolefin-based resins; and styrene-based resins. Specific examples of the ionizing radiation-curable resin include an epoxy acrylate-based resin and a urethane acrylate-based resin. Those resins may be used alone or in combination thereof.

The thickness of the substrate is, for example, from 10 µm to 100 µm, preferably from 10 µm to 50 µm.

The refractive index of the substrate is preferably 1.47 or more, more preferably from 1.47 to 1.60, still more preferably from 1.47 to 1.55. When the refractive index fails within such ranges, light extracted from the light guide plate can be introduced into the image display cell without being adversely affected.

C. Low-Refractive Index Layer

The low-refractive index layer typically has pores therein. The porosity of the low-refractive index layer is 50% or more as described above, and is preferably 70% or more, more preferably 80% or more. Meanwhile, the porosity is, for example, 90% or less, preferably 85% or less. When the porosity falls within the ranges, the refractive index of the low-refractive index layer can be set within an appropriate range.

The refractive index of the low-refractive index layer is preferably 1.30 or less, more preferably 1.20 or less, still more preferably 1.15 or less. The lower limit of the refractive index may be, for example, 1.01. When the refractive index falls within such ranges, extremely excellent light utilization efficiency can be achieved in the laminated structure of the light guide plate and the peripheral member obtained via the optical laminate with pressure-sensitive adhesive layers on both surfaces.

Any appropriate configuration may be adopted for the low-refractive index layer as long as the layer has the above-mentioned desired porosity and refractive index. The low-refractive index layer may be preferably formed through, for example, application or printing. Materials described in, for example, WO 2004/113966 A1, JP 2013-254133 A, and JP 2012-189802 A may each be adopted as a material for forming the low-refractive index layer. Specific examples thereof include: silica-based compounds; hydrolyzable silanes, and partial hydrolysates and dehydration condensates thereof; organic polymers; silanol group-containing silicon compounds; active silica obtained by bringing a silicate into contact with an acid or an ion-exchange resin; polymetizable monomers (e.g., a (meth) acrylic monomer and a styrene-based monomer); curable resins (e.g., a (meth)acrylic resin, a fluorine-containing resin, and a urethane resin); and combinations thereof.

The size of each of the pores (holes) in the low-refractive index layer refers to a major axis diameter out of the major axis diameter and minor axis diameter of the pore (hole). The sizes of the pores (holes) are, for example, from 2 nm to 500 nm. The sizes of the pores (holes) are, for example, 2 nm or more, preferably 5 nm or more, more preferably 10 nm or more, still more preferably 20 nm or more. Meanwhile, the sizes of the pores (holes) are, for example, 500 nm or less, preferably 200 nm or less, more preferably 100 nm or less. The range of the sizes of the pores (holes) is, for example, from 2 nm to 500 nm, preferably from 5 nm to 500 nm, more preferably from 10 nm to 200 nm, still more preferably from 20 nm to 100 nm. The sizes of the pores (holes) may be adjusted to desired sizes in accordance with, for example, a purpose and an application.

The sizes of the pores (holes) may be quantified by a BET test method. Specifically, 0.1 g of the sample (formed pore layer) is loaded into the capillary of a specific surface area-measuring apparatus (manufactured by Micromeritics Instrument Corporation, ASAP 2020), and is then dried under reduced pressure at room temperature for 24 hours so that a gas in its pore structure may be removed. Then, an adsorption isotherm is drawn by causing the sample to adsorb a nitrogen gas, and its pore size distribution is determined. Thus, the pore sizes may be evaluated.

The haze of the low-refractive index layer is, for example, less than 5%, preferably less than 3%. Meanwhile, the haze is, for example, 0.1% or more, preferably 0.2% or more. The range of the haze is, for example, 0.1% or more and less than 5%, preferably 0.2% or more and less than 3%. The haze may be measured by, for example, such a method as described below. The haze is an indicator of the transparency of the low-refractive index layer.

The pore layer (low-refractive index layer) is cut into a size measuring 50 mm by 50 mm, and is set in a haze meter (manufactured by Murakami Color Research Laboratory Co., Ltd.: HM-150), followed by the measurement of its haze. The haze value is calculated from the following equation.

Haze (%)=[diffuse transmittance (%)/total light transmittance (%)]×100(%)

The low-refractive index layer having the pores therein is, for example, a low-refractive index layer having a porous layer and/or an air layer in at least part thereof. The porous layer typically contains aerogel and/or particles (e.g., hollow fine particles and/or porous particles). The low-refractive index layer may be preferably a nanoporous layer (specifically a porous layer in which the diameters of 90% or more of micropores fall within the range of from $10^{-1}$ nm to $10^3$ nm).

Any appropriate particles may be adopted as the particles. The particles are each typically formed of a silica-based compound. Examples of the shapes of the particles include a spherical shape, a plate shape, a needle shape, a string shape, and a botryoidal shape. String-shaped particles are, for example, particles in which a plurality of particles each having a spherical shape, a plate shape, or a needle shape are strung together like beads, short fiber-shaped particles (e.g., short fiber-shaped particles described in JP 2001-188104 A), and a combination thereof. The string-shaped particles may be linear or may be branched. Botryoidal-shaped particles are, for example, particles in which a plurality of spherical, plate-shaped, and needle-shaped particles aggregate to form a botryoidal shape. The shapes of the particles may be identified through, for example, observation with a transmission electron microscope. The average particle diameter of the particles is, for example, from 5 nm to 200 nm, preferably from 10 nm to 200 nm. When the particles have the above-mentioned configuration, a low-refractive index layer having a sufficiently low refractive index can be obtained, and the transparency of the low-refractive index layer can be maintained. The term "average particle diameter" as used herein means a value determined from the specific surface area ($m^2$/g) of the particles, which is measured by a nitrogen adsorption method (BET method), by the equation "average particle diameter=(2,720/specific surface area)" (see JP 01-317115 A).

The thickness of the low-refractive index layer is preferably from 0.2 μm to 5 μm, more preferably from 0.3 μm to 3 μm. When the thickness of the low-refractive index layer falls within such ranges, a damage-preventing effect exhibited by the present invention becomes significant.

As described above, the low-refractive index layer may be typically formed through application or printing. With such configuration, the low-refractive index layer can be continuously arranged by a roll-to-roll process. The low-refractive index layer may be formed on the entire surface of the substrate, or may be formed in a predetermined pattern. When the low-refractive index layer is formed in the predetermined pattern, the application is performed through, for example, a mask having the predetermined pattern. Any appropriate system may be adopted for the printing. Specifically, a printing method may be a plate printing method, such as gravure printing, offset printing, or flexographic printing, or may be a plateless printing method, such as inkjet printing, laser printing, or electrostatic printing.

An example of a specific configuration of the low-refractive index layer is described below. The low-refractive index layer of this embodiment is formed of one or a plurality of kinds of constituent units each forming a fine pore structure, and the constituent units are chemically bonded to each other through a catalytic action. Examples of the shape of each of the constituent units include a particle shape, a fiber shape, a rod shape, and a flat plate shape. The constituent units may have only one shape, or may have two or more shapes in combination. In the following description, a case in which the low-refractive index layer is a pore layer of a porous body in which microporous particles are chemically bonded to each other is mainly described.

Such pore layer may be formed by, for example, chemically bonding the microporous particles to each other in a pore layer-forming step. In the embodiment of the present invention, the shapes of the "particles" (e.g., the microporous particles) are not particularity limited. For example, the shapes may each be a spherical shape, or may each be any other shape. In addition, in the embodiment of the present invention, the microporous particles may be, for example, sol-gel beaded particles, nanoparticles (hollow nanosilica nanoballoon particles), or nanofibers. The microporous particles each typically contain an inorganic substance. Specific examples of the inorganic substance include silicon (Si), magnesium (Mg), aluminum (Al), titanium (Ti), zinc (Zn), and zirconium (Zr) Those inorganic substances may be used alone or in combination thereof. In one embodiment, the microporous particles are, for example, microporous particles of a silicon compound, and the porous body is, for example, a silicone porous body. The microporous particles of the silicon compound each contain, for example, a pulverized body of a gel-like, silica compound. In addition, another form of the low-refractive index layer having the porous layer and/or the air layer in at least part thereof is, for example, a pore layer having the following features: the layer is formed of fibrous substances, such as nanofibers; and the fibrous substances are entangled with each other to form pores, thereby forming the layer. A method of producing such pore layer is not particularly limited, and is the same as that in the case of, for example, the pore layer of the porous body in which the microporous particles are chemically bonded to each other. Still another form thereof is, for example, a pore layer using hollow nanoparticles or nanoclay, or a pore layer formed by using hollow nanoballoons or magnesium fluoride. The pore layer may be a pore layer formed of a single constituent substance, or may be a pore layer formed of a plurality of constituent substances. The pore layer may include any one of the above-mentioned forms, or may include two or more of the above-mentioned forms.

In this embodiment, the porous structure of the porous body may be, for example, an open-cell structural body in which hole structures are continuous with each other. The open-cell structural body means, for example, that the hole structures are three-dimensionally continuous with each other in the silicone porous body, and can be said to be a state in which the internal pores of the hole structures are continuous with each other. When the porous body has an open-cell structure, its porosity can be increased. However, when closed-ceil particles (particles each individually having a hole structure), such as hollow silica, are used, an open-cell structure cannot be formed. Meanwhile, for example, when silica sol particles (pulverized products of a gel-like silicon compound that forms sol) are used, the particles each have a three-dimensional dendritic structure, and hence the dendritic particles are sedimented and deposited in a coating film (coating film of the sol containing the pulverized products of the gel-like silicon compound). Accordingly, an open-cell structure can be easily formed. The low-retractive index layer more preferably has a monolith structure in which an open-cell structure includes a plurality of pore size distributions. The monolith structure means, for example, a hierarchical structure including a structure in which nanosized fine pores are present and an open-cell structure in which the nanosized pores assemble. When the monolith structure is formed, both of film strength and a high porosity may be achieved by, for example, imparting the high porosity to the layer through the use of a coarse open-cell pore while imparting the film strength thereto through the use of a fine pore. Such monolith structure may be preferably formed by controlling the pore size distribution of a pore structure to be produced in the gel (gel-like silicon compound) at a stage before its pulverization into the silica sol particles. In addition, the monolith structure may be formed by, for example, controlling the particle size distribution of the silica sol particles after the pulverization to a desired size at the time of the pulverization of the gel-like silicon compound.

The low-refractive index layer contains, for example, the pulverized products of a gel-like compound as described above, and the pulverized products are chemically bonded to each other. The form of the chemical bond (chemical bonding) between the pulverized products in the low-refractive index layer is not particularly limited, and examples thereof include a cross-linking bond, a covalent bond, and a hydrogen bond.

The gel form of the gel-like compound is not particularly limited. The term "gel" generally refers to a state in which the mixture of a solvent and a solute is solidified because the solute loses its independent mobility owing to an interaction between its molecules to have a structure in which the molecules assemble. For example, the gel-like compound may be wet gel or may be xerogel. In general, the wet gel refers to gel which contains a dispersion medium and in which a solute has a uniform structure in the dispersion medium, and the xerogel refers to gel from which a solvent is removed, and in which a solute has a network structure having pores.

The gel-like compound is, for example, a gelled product obtained by causing a monomer compound to gel. The gel-like silicon compound is specifically, for example, & gelled product in which the molecules of monomer silicon compound are bonded to each other, and the gelled product is specifically, for example, a gelled product in which the molecules of the monomer silicon compound are bonded to each other by a covalent bond, a hydrogen bond, or an intermolecular force. The covalent bond is, for example, a bond formed by dehydration condensation.

The volume-average particle diameter of the pulverized products in the low-refractive index layer is, for example, 0.10 vim or more, preferably 0.20 μm or more, more preferably 0.40 μm or more. Meanwhile, the volume-average particle diameter is, for example, 2.00 μm or less, preferably 1.50 μm or less, more preferably 1.00 μm or less. The range of the volume-average particle diameter is, for example, from 0.10 μm to 2.00 μm, preferably from 0.20 μm to 1.50 μm, more preferably from 0.40 μm to 1.00 μm. The particle size distribution of the pulverized products may be measured with, for example, a particle size distribution-evaluating apparatus based on a dynamic light scattering method, a laser diffraction method, or the like, and an electron microscope, such as a scanning electron microscope (SEM) or a transmission electron microscope (TEM). The volume-average particle diameter is an indicator of a variation in particle size of the pulverized products.

In the particle size distribution of the pulverized products, particles each having a particle diameter of from 0.4 μm to 1 μm may exist at a ratio of, for example, from 50 wt % to 99.9 wt %, preferably from 30 wt % to 99.8 wt %, more preferably from 90 wt % to S9.7 wt %. Alternatively, particles each having a particle diameter of from 1 μm to 2 μm may exist at a ratio of, for example, from 0.1 wt % to 50 wt %, preferably from 0.2 wt % to 20 wt %, more preferably from 0.3 wt % to 10 wt %. The particle size distribution may be measured with, for example, a particle size distribution-evaluating apparatus or an electron microscope. The particle size distribution is also an indicator of a variation in particle size of the pulverized products.

The kind of the gel-like compound is not particularly-limited. The gel-like compound is, for example, a gel-like silicon compound. A case in which the gel-like compound is the gel-like silicon compound is described below as an example, but the present invention is not limited thereto.

The above-mentioned cross-linking bond is, for example, a siloxane bond. Examples of the siloxane bond include such a bond T2, a bond T3, and a bond T4 as represented below. When the porous layer (low-refractive index layer) has a siloxane bond, the layer may have any one of the bonds, may have any two of the bonds, or may have all the three of the bonds. As the ratios the T2 and the T3 out of the siloxane bonds become larger, the gel-like compound is richer in flexibility, and hence a characteristic inherent in gel can be expected. Meanwhile, as the ratio of the T4 becomes larger, the film strength of the layer is more easily expressed. Therefore, the ratios of the T2, the T3, and the T4 are preferably changed in accordance with, for example, a purpose, an application, and a desired characteristic.

In addition, for example, silicon atoms in the low-refractive index layer (porous layer) are preferably bonded to each other by a siloxane bond. As a specific example, the ratio of unbonded silicon atoms (i.e., residual silanol) out of all the silicon atoms in the porous layer is, for example, less than 50%, preferably 30% or less, more preferably 15% or less.

When the gel-like compound is the gel-like silicon compound, its monomer silicon compound is not particularly limited. The monomer silicon compound is, for example, a compound represented by the below-indicated formula (1). When the gel-like silicon compound is a gelled product in which the molecules of the monomer silicon compound are bonded to each other by a hydrogen bond or an intermolecular force as described above, the molecules of the monomer represented by the formula (1) may be hydrogen-bonded to each other through, for example, their respective hydroxy groups.

In the formula (1), X represents, for example, 2, 3, or 4, preferably 3 or 4, $R^1$ represents, for example, a linear or branched alkyl group, and the number of carbon atoms of $R^1$ is, for example, from 1 to 6, preferably from 1 to 4, more preferably 1 or 2. Examples of the linear alkyl group include a methyl group, an ethyl group, a propyl group, a butyl group, a pentyl group, and a hexyl group, and examples of the branched alkyl group include an isopropyl group and an isobutyl group.

The silicon compound represented by the formula (i) is specifically, for example, a compound represented by the below-indicated formula (1') in which X represents 3. In the be low-indicated formula (1'), $R^1$ is the same as that in the case of the formula (1), and represents, for example, a methyl group. When $R^1$ represents a methyl group, the silicon compound is tris(hydroxy)methylsilane. When X represents 3, the silicon compound is, for example, a trifunctional silane having three functional groups.

Another specific example of the silicon compound represented by the formula (1) is a compound in which X represents 4. In this case, the silicon compound is, for example, a tetrafunctional silane having four functional groups.

The monomer silicon compound may be, for example, a hydrolysate of a silicon compound precursor. The silicon compound precursor only needs to be, for example, a precursor capable of producing the silicon compound through hydrolysis, and is specifically, for example, a compound represented by the below-indicated formula (2).

In the formula (2), X represents, for example, 2, 3, or 4, $R^1$ and $R^2$ each independently represent a linear or branched alkyl group,
$R^1$ and $R^2$ may be identical to or different from each other, when X represents 2, $R^1$s may be identical to or different from each other, and
$R^2$s may be identical to or different from each other,
X and $R^1$ are the same as, for example, X and $R^1$ in the formula (1). The examples of $R^1$ in the formula (1) may be incorporated as examples of $R^2$.

The silicon compound precursor represented by the formula (2) is specifically, for example, a compound represented by the below-indicated formula (2') in which X represents 3. In the below-indicated formula (2'), $R^1$ and $R^2$ are the same as those in the case of the formula (2). When $R^1$ and $R^2$ each represent a methyl group, the silicon compound precursor is trimethozy(methyl)silane (hereinafter sometimes referred to as "MTMS").

The monomer silicon compound is preferably a trifunctional silane because of, for example, its excellent low refractive index characteristic. Meanwhile, the monomer silicon compound is preferably a tetrafunctional silane because of, for example, its excellent strength (e.g., scratch resistance). The monomer silicon compounds may be used alone or in combination thereof. For example, the low-refractive index layer may contain only the trifunctional silane as the monomer silicon compound, may contain only the tetrafunctional silane as such compound, may contain both of the trifunctional silane and the tetrafunctional silane as such compounds, or may further contain any other silicon compound as such compound. When two or more silicon compounds are used as the monomer silicon compounds, their ratios are not particularly limited, and may be appropriately set.

An example of a method of forming such low-refractive, index layer is described below.

The method typically includes a precursor-forming step of forming a porous structure that is a precursor of the low-refractive index layer (porous layer) on a resin film, and a cross-linking reaction step of causing a cross-linking reaction inside the precursor after the precursor-forming step. The method further includes a containing liquid-producing step of producing a containing liquid containing microporous particles (hereinafter sometimes referred to as "microporous particle-containing liquid" or simply "containing liquid"), and a drying step of drying the containing liquid, and in the precursor-forming step, the microporous particles in the dried body are chemically bonded to each other to form the precursor. The containing liquid is not particularly limited, and is, for example, a suspension containing the microporous particles. In the following description, a case in which the microporous particles are the pulverized products of the gel-like compound, and the porous layer is a porous body (preferably a silicone porous body) containing the pulverized products of the gel-like compound is mainly described. However, the low-refractive index layer may be similarly formed even in the case where the microporous particles are those ether than the pulverized products of the gel-like compound.

According to the method, for example, a low-refractive index layer (porous layer) having an extremely low refractive index is formed. A reason therefor is assumed to be, for example, as described below. However, the assumption does not limit the present invention and the method of forming the low-refractive index layer.

The pulverized products are obtained by pulverizing the gel-like silicon compound, and hence the three-dimensional structure of the gel-like silicon compound before the pulverization is brought into a state of being dispersed into three-dimensional basic structures. Further, in the above-mentioned method, the crushed products of the gel-like silicon compound are applied onto the resin film to form a precursor of a porous structure based on the three-dimensional basic structures. In other words, according to the method, new porous structures (three-dimensional basic structures) as a result of the application of the pulverized products, which are different from the three-dimensional structure of the gel-like silicon compound, are formed. Accordingly, in the porous layer to be finally obtained, for example, such a low refractive index that the layer functions to the same extent as an air layer does can be achieved. Further, in the method, the pulverized products are chemically bonded to each other, and hence the three-dimensional basic structures are fixed. Accordingly, the porous layer to be finally obtained can maintain sufficient strength and sufficient flexibility despite the fact that the layer is a structure having pores.

Further, in the above-mentioned method, the precursor-forming step and the cross-linking reaction step are performed as separate steps. In addition, the cross-linking reaction step is preferably performed in a plurality of stages. In the case where the cross-linking reaction step is performed in a plurality of stages, the strength of the precursor is further improved as compared to, for example, that in the case where the cross-linking reaction step is performed in one stage, and hence a low-refractive index layer achieving both of a high porosity and strength can be obtained. Although a mechanism for the foregoing is unclear, the mechanism is assumed to be, for example, as described below. That is, as described above, when the film strength of the porous layer is improved with a catalyst, or the like simultaneously with the formation of the porous layer, there is a problem in that the porosity thereof reduces, though the film strength is improved by the advance of a catalytic reaction. This is probably because of, for example, the following reason: a cross-linking reaction between the microporous particles is advanced by the catalyst to increase the number of cross-linkages (chemical bonds) between the microporous particles, and hence a bond between the particles is strengthened, but the entirety of the porous layer condenses to reduce the porosity. In contrast, when the precursor-forming step and the cross-linking reaction step are performed as separate steps, and the cross-linking reaction step is performed in a plurality of stages, for example, the following is conceivable: the number of the cross-linkages (chemical bonds) can be increased while the form of the entirety of the precursor is not changed to a very large extent (e.g., the condensation of the entirety thereof is not caused to a very large extent). However, the foregoing is an example of an assumable mechanism, and hence does not limit the method of forming the low-refractive index layer.

In the precursor-forming step, for example, particles each having a certain shape are laminated to form the precursor of the porous layer. The strength of the precursor at the time point is extremely weak. After that, a product capable of chemically bonding the microporous particles to each other (e.g., a strong base catalyst generated from a photobase generator) is generated by, for example, a photoactive or thermally active catalytic reaction (first stage of the cross-linking reaction step). When heat aging (second stage of the cross-linking reaction step) is further performed for advancing the reaction efficiently and in a short time period, the chemical bonding (cross-linking reaction) between the microporous particles may further advance to improve the strength. For example, when the microporous particles are the microporous particles of a silicon compound (e.g., the pulverized bodies of a gel-like silica compound), and residual silanol groups (Si—OH groups) are present in the precursor, the residual silanol groups may be chemically bonded to each other by a cross-linking reaction therebetween. However, the description is also merely an example, and hence does not limit the method of forming the low-refractive index layer.

The above-mentioned method includes the containing liquid-producing step of producing the containing liquid containing the microporous particles. When the microporous particles are the pulverized products of the gel-like compound, the pulverized products are obtained by, for example, pulverizing the gel-like compound. As described above, the pulverization of the gel-like compound breaks the three-dimensional structure of the gel-like compound to disperse the structure into the three-dimensional basic structures. An example of the preparation of the pulverized products is as described below.

The gelation of the monomer compound may be performed by, for example, bonding the molecules of the monomer compound to each other through the use of a hydrogen bond or an intermolecular force. The monomer compound is, for example, a silicon compound represented by the formula (1). The silicon compound represented by the formula (1) has a hydroxy group, and hence the molecules of the monomer represented by the formula (1) may be bonded to each other by a hydrogen bond or an intermolecular force through, for example, their respective hydroxy groups.

Alternatively, the silicon compound may be the hydrolysate of the silicon compound precursor described above, and may be produced by, for example, hydrolyzing a silicon compound precursor represented by the formula (2).

A method of hydrolyzing the silicon compound precursor is not particularly limited, and the hydrolysis may be performed by, for example, a chemical reaction in the presence of a catalyst. Examples of the catalyst include acids such as oxalic acid and acetic acid. The hydrolysis reaction may be performed by, for example, slowly dropping and mixing an aqueous solution of oxalic acid into a mixed liquid (e.g., a suspension) of the silicon compound and dimethyl sulfoxide under a room-temperature environment, and then stirring the mixture for about 30 minutes without treating the mixture. At the time of the hydrolysis of the silicon compound precursor, for example, when the alkoxy groups of the silicon compound precursor are completely hydrolyzed, the gelation after the hydrolysis, aging, heating after the formation of the porous structure, and fixation may be more efficiently performed.

The gelation of the monomer compound may be performed by, for example, a dehydration condensation reaction between the molecules of the monomer. The dehydration condensation reaction is preferably performed in the presence of, for example, a catalyst, and examples of the catalyst include dehydration condensation catalysts including: acid catalysts, such as hydrochloric acid, oxalic acid, and sulfuric acid; and base catalysts, such as ammonia, potassium hydroxide, sodium hydroxide, and ammonium hydroxide. Of those dehydration condensation catalysts, a base catalyst is preferred. In the dehydration condensation reaction, the addition amount of the catalyst with respect to the monomer compound is not particularly limited. The catalyst may be added in an amount of, for example, preferably from 0.05 mol to 10 mol, more preferably from 0.1 mol to 7 mol, still more preferably from 0.1 mol to 5 mol with respect to 1 mol of the monomer compound.

The gelation of the monomer compound is preferably performed in, for example, a solvent. The ratio of the monomer compound to the solvent is not particularly limited. Examples of the solvent include dimethyl sulfoxide (DMSO), N-methylpyrrolidone (MMP), N,N-dimethylacetamide (DMhe), dimethylformamide (DMF), γ-butyrolactone (GBL), acetonitrile (MeCN), and ethylene glycol ethyl ether (EGEE). The solvents may/be used alone or in combination thereof. The solvent to be used in the gelation is hereinafter sometimes referred to as "solvent for gelation".

Conditions for the gelation are not particularly limited. The temperature at which the solvent containing the monomer compound is treated is, for example, from 20° C. to 30° C., preferably from 22° C. to 28° C., more preferably from 24° C. to 26° C. The time period of the treatment is, for example, from 1 minute to 60 minutes, preferably from 5 minutes to 40 minutes, more preferably from 10 minutes to 30 minutes. When the dehydration condensation reaction is performed, treatment conditions therefor are not particularly limited, and those examples may be incorporated. When the gelation is performed, for example, a siloxane bond grows to form silica primary particles, and as the reaction further advances, the primary particles are strung together like beads to produce gel having a three-dimensional structure.

The gel-like compound obtained by the gelation is preferably subjected to an aging treatment after the gelation reaction. The aging treatment may further grow, for example, the primary particles of the gel having a three-dimensional structure obtained by the gelation to increase the sizes of the particles themselves. As a result, the contact state of a neck portion where the particles are in contact with each other can be changed from point contact to surface contact (the area of contact therebetween can be increased). The gel that has been subjected to the aging treatment is improved in, for example, strength of the gel itself, and as a result, the strength of each of the three-dimensional basic structures after the performance of the pulverization can be improved. Thus, in, for example, the drying step after the application of the pulverized products, the shrinkage of the pore size of the porous structure obtained by the deposition of the three-dimensional basic structures along with the volatilization of the solvent of the application liquid in the drying process can be suppressed.

The aging treatment may be performed by, for example, incubating the gel-like compound at a predetermined temperature for a predetermined time period. The aging temperature is, for example, 30° C. or more, preferably 35° C. or more, more preferably 40° C. or more. Meanwhile, the aging temperature is, for example, 80° C. or less, preferably 75° C. or less, more preferably 70° C. or less. The range of the aging temperature is, for example, from 30° C. to 80° C., preferably from 35° C. to 75° C., more preferably from 40° C. to 70° C. The aging time is, for example, 5 hours or more, preferably 10 hours or more, more preferably 15 hours or more. Meanwhile, the aging time is, for example, 50 hours or less, preferably 40 hours or less, more preferably 30 hours or less. The range of the aging time is, for example, from 5 hours to 50 hours, preferably from 10 hours to 40 hours, more preferably from 15 hours to 30 hours. The aging conditions may be optimized so that, for example, increases in sizes of the silica primary particles and an increase in contact area of the neck portion may be achieved. Further, the boiling point of a solvent that, has been used in the treatment is preferably considered. For example, when the aging temperature is excessively high, the solvent, may excessively volatilize to cause an inconvenience such as the closing of the fine pores of the three-dimensional porous structure due to the condensation of the concentration of the application liquid (gel liquid). Meanwhile, for example, when the aging temperature is excessively low, an effect exhibited by the aging is not sufficiently obtained. Moreover, a variation in temperature with time in a mass-production process for the low-refractive index layer increases, and hence a low-refractive index layer poor in characteristics may be formed.

For example, the same solvent as that of the gelation treatment may be used in the aging treatment. Specifically, the reaction product after the gelation treatment (i.e., the solvent containing the gel-like compound) is preferably subjected as it is to the aging treatment. The number of moles of residual silanol groups in the gel (the gel-like compound, for example, the gel-like silicon compound) that has finished being subjected to the aging treatment after the gelation is, for example, 50% or less, preferably 40% or less, more preferably 30% or less. Meanwhile, the number of moles of the residual silanol groups is, for example, 1% or more, preferably 3% or more, mere preferably 5% or more. The range of the number of moles of the residual silanol groups is, for example, from 1% to 50%, preferably from 3% to 40%, more preferably from 5% to 30%. To improve the hardness of the gel, for example, the number of moles of the residual silanol groups is preferably as small as possible. When the number of moles of the silanol group) s is excessively large, for example, it may become impossible to retain the porous structure by the time when the precursor of the silicone porous body is cross-linked. Meanwhile, when the number of moles of the silanol groups is excessively small, there is a risk in that in, for example, the step of producing the microporous particle-containing liquid (e.g., a suspension) and/or any subsequent step, the pulverized products of the gel-like compound cannot be cross-linked, and hence sufficient film strength cannot be imparted to the low-refractive index layer. The number of moles of the residual silanol groups is, for example, the ratio of the residual silanol groups when the number of moles of the alkoxy groups of the raw material for the layer (e.g., the monomer compound precursor) is set to 100. The foregoing is an example of a case in which silanol groups remain, but for example, when the monomer silicon compound is modified with various reactive functional groups, the same matters, conditions, and the like as those described above may also be applied to the respective functional groups.

After the gelation of the monomer compound in the solvent for gelation, the resultant gel-like compound is pulverized. With regard to the pulverization, for example, the gel-like compound in the solvent for gelation may foe subjected as it is to the pulverization treatment, or the following may foe performed: the solvent for gelation is replaced with any other solvent, and then the gel-like compound in the other solvent is subjected to the pulverization treatment. In addition, for example, when the catalyst and the solvent that have been used in the gelation reaction remain even after the aging step to cause the gelation (pot life) of the liquid with time and a reduction in drying efficiency at the time of the drying step, the solvent for gelation is preferably replaced with the other-solvent. The other solvent is hereinafter sometimes referred to as "solvent for pulverization".

The solvent for pulverization is not particularly limited, and for example, an organic solvent may be used. The organic solvent is, for example, a solvent having a boiling point of 130° C. or less, preferably 100° C. or less, more preferably 85° C. or less. Specific examples thereof include isopropyl alcohol (IPA), ethanol, methanol, butanol, propylene glycol monomethyl ether (PGME), methyl cellosolve, acetone, dimethylformamide (DMF), and isobutyl alcohol. The solvents for pulverization may be used alone or in combination thereof.

The combination of the solvent for gelation and the solvent for pulverization is not particularly limited, and examples thereof include: a combination of DMSO and IPA; a combination of DMSO and ethanol; a combination of DMSO and methanol; a combination of DMSO and butanol; and a combination of DMSO and isobutyl alcohol. When the solvent for gelation is replaced with the solvent for pulverization as described above, in, for example, coating film formation to be described later, a more uniform coating film may be formed.

A method of pulverizing the gel-like compound is not particularly limited, and the pulverization may be performed with, for example, an ultrasonic homogenizer, a high-speed rotation homogenizer, or any other pulverizing apparatus using a cavitation phenomenon. While an apparatus configured to perform media pulverization, such as a ball mill, physically breaks, for example, the porous structure of the gel at the time of the pulverization, a cavitation-type pulverizing apparatus, such as a homogenized, is of, for example, a media-less system, and hence peels off a bonding surface between silica particles relatively weakly bonded to each other, the particles having already been included in the three-dimensional structure of the gel, with a high-speed shear force. Thus, the gel three-dimensional structure to be obtained may retain, for example, a porous structure having a particle size distribution in a certain range, and hence the porous structure obtained by the deposition at the time of the application and drying of the application liquid may be formed again. Conditions for the pulverization are not particularly limited, and for example, it is preferred that a high-speed flow be instantaneously/applied to the liquid to enable the pulverization of the gel without the volatilization of the solvent of the liquid. For example, the gel is preferably/pulverized into pulverized products having such a particle size variation (e.g., a volume-average particle diameter or a particle size distribution) as described above. If the amount of work done to the gel, such as a pulverization time or strength, is insufficient, for example, there is a risk; in that coarse particles remain to preclude the formation of dense fine pores, and moreover, the number of appearance defects increases to make it impossible to obtain high quality. Meanwhile, when the amount of the work is excessively large, for example, there is a risk in that particles finer than the desired particle size distribution are obtained, and hence the sizes of the pores deposited after the application and the drying become finer to make it impossible to obtain a desired porosity.

As described above, a liquid (e.g., a suspension) containing the microporous particles (pulverized products of the gel-like compound) may be produced. Further, the addition of a catalyst that chemically bonds the microporous particles to each other after the production of the liquid containing the microporous particles or during the production step enables the production of a containing liquid containing the microporous particles and the catalyst. The catalyst may be, for example, a catalyst that accelerates a cross-linking bond between the microporous particles. A dehydration condensation reaction between residual silanol groups in silica sol molecules is preferably utilized as a chemical reaction for chemically bonding the microporous particles to each other. When the reaction between the hydroxy groups of the silanol groups is accelerated with the catalyst, continuous film formation in which the porous structure is cured in a short time period becomes possible. Examples of the catalyst include a photoactive catalyst and a thermally active catalyst. The photoactive catalyst enables a chemical bond (e.g., a cross-linking bond) between the microporous particles without reliance on heating in, for example, the precursor-forming step. According to the foregoing, in, for example, the precursor-forming step, the shrinkage of the entirety of the precursor hardly occurs, and hence a higher porosity can be maintained. In addition, a substance that generates a catalyst (catalyst, generator) may be used in addition to the catalyst or instead thereof. For example, a substance that generates a catalyst with light (photocatalyst generator) may be used in addition to the photoactive catalyst or instead thereof, or a substance that generates a catalyst with heat (thermal catalyst generator) may be used in addition to the thermally active catalyst or instead thereof. Examples of the photocatalyst generator include a photobase generator (substance that generates a basic catalyst through light irradiation) and a photoacid generator (substance that generates an acidic catalyst through light irradiation). Of those, a photobase generator is preferred. Examples of the photobase generator include 9-anthrylmethyl N,N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino)methylene]guanidium 2-(3-benzoylphenyl)propionate (product name: WFBG-266), 1,2-dicyclohexyl-4,4,5,5-tetramethylbiguanidium n-butyltriphenyl borate (product name: WPBG-300), 2-(9-oxoxanthen-2-yl)propionic acid 1,5,7-triazabicyclo[4.4.0]dec-5-ene (Tokyo Chemical Industry Co., Ltd.), and a compound containing 4-piperidine methanol (product name: HDPD-PB100: manufactured by Heraeus). Each product name including the "WPBG" is a product name of Wake Pure Chemical Industries, Ltd. Examples of the photoacid generator include an aromatic sulfonium salt (product name: SP-170: ADEKA Corporation), a triaryl sulfonium salt (product name: CPI101A: San-Apro Ltd.), and an aromatic iodonium salt (product, name: Irgacure 250: Ciba Japan). In addition, the catalyst that, chemically bonds the microporous particles to each other is not limited to the photoactive catalyst and the photocatalyst generator, and may be, for example, the thermally active catalyst or the thermal catalyst generator, such as urea. Examples of the catalyst that chemically bonds the micro-porous particles to each other include: base catalysts, such as potassium hydroxide, sodium hydroxide, and ammonium hydroxide; and acid catalysts, such as hydrochloric acid, acetic acid, and oxalic acid. Of those, a base catalyst is preferred. The catalyst or catalyst, generator that chemically bonds the microporous particles to each other may be used, for example, as follows: the catalyst or the catalyst generator is used by being added to a sol particle liquid (e.g., a suspension) containing the pulverized products (microporous particles) immediately before the application of the liquid; or the catalyst or the catalyst generator is used as a mixed liquid obtained by mixing the catalyst or the catalyst generator in a solvent. The mixed liquid may be, for example, an application liquid obtained by directly adding and dissolving the catalyst or the catalyst generator in the sol particle liquid, a solution obtained by dissolving the catalyst or the catalyst generator in the solvent, or a dispersion obtained by dispersing the catalyst or the catalyst generator in the solvent. The solvent is not particularly limited, and examples thereof include water and a buffer solution.

Next, the containing liquid (e.g., a suspension) containing the microporous particles is applied onto the substrate (applying step). For example, various application systems to be described later may each be used in the application, and a system for the application is not limited thereto. Direct application of the containing liquid containing the microporous particles (e.g., the pulverized products of the gel-like silica compound) onto the substrate may form a coating film containing the microporous particles and the catalyst. The coating film may be referred to as, for example, "coating layer". When the coating film is formed, for example, the pulverized products whose three-dimensional structures have been broken are sedimented and deposited to build a new three-dimensional structure. For example, the containing liquid containing the microporous particles may be free of the catalyst that chemically bonds the microporous particles to each other. For example, as described later, the precursor-forming step may be performed after the catalyst that chemically bonds the microporous particles to each other has been blown onto the coating film, or while the catalyst is blown onto the film. However, the containing liquid containing the microporous particles may contain the catalyst that chemically bonds the microporous particles to each other, and the microporous particles may be chemically/bonded to each other through the action of the catalyst in the coating film to form the precursor of the porous body.

The above-mentioned solvent (hereinafter sometimes referred to as "solvent for application") is not particularly limited, and for example, an organic solvent may be used. The organic solvent is, for example, a solvent having a boiling point of 150° C. or less. Specific examples thereof include IPA, ethanol, methanol, n-butanol, 2-butanol, isobutyl alcohol, and pentanoi. In addition, the same solvent as the solvent for pulverization may be used. When the method of forming the low-refractive index layer includes the step of pulverizing the gel-like compound, for example, the solvent for pulverization containing the pulverized products of the gel-like compound may be used as it is in the step of forming the coating film.

In the applying step, for example, sol-like pulverized products dispersed in the solvent (hereinafter sometimes referred to as "sol particle liquid") are preferably applied onto the substrate. When the sol particle liquid is subjected to, for example, the chemical cross-linking after its application onto the substrate and its drying, a porous layer having a certain level or more of film strength may be continuously formed. The term "sol" as used in the embodiment of the present invention refers to the following state: when the three-dimensional structure of the gel is pulverized, silica sol particles of nano three-dimensional structures retaining part of the porous structure are dispersed in the solvent to show fluidity.

The concentration of the pulverized products in the solvent for application is not particularly limited, and is, for example, from 0.3% (v/v) to 50% (v/v), preferably from 0.5% (v/v) to 30% (v/v), more preferably from 1.0% (v/v) to 10% (v/v). When the concentration of the pulverized products is excessively high, for example, the fluidity of the sol particle liquid may remarkably reduce to cause an aggregate or an application stripe at the time of its application. When the concentration of the pulverized products is excessively low, for example, there is a risk in that a considerable time period is required for the drying of the solvent of the sol particle liquid, and moreover, the concentration of the residual solvent immediately after the drying increases, and hence the porosity of the low-refractive index layer reduces.

The physical properties of the sol are not particularly limited. The sol has a shear viscosity of, for example, 100 cPa·s or less, preferably 10 cPa·s or less, more preferably 1 cPa·s or less at a shear rate of 1,000 l/s. When the shear viscosity is excessively high, for example, an application stripe may occur to cause an inconvenience such as a reduction in transfer ratio of gravure coating. In contrast, when the shear viscosity is excessively low, for example, there is a risk in that the wet application thickness of the sol at the time of its application cannot be increased, and hence a desired thickness is not obtained after its drying.

The amount of the pulverized products to be applied to the substrate is not particularly limited, and may be appropriately set in accordance with, for example, a desired thickness of the silicone porous body (consequently, the low-refractive index layer). As a specific example, when a silicone porous body having a thickness of from 0.1 μm to 1,000 μm is formed, the amount of the pulverized products to be applied to the substrate is, for example, from 0.01 μg to 60,000 μg, preferably from 0.1 μg to 5,000 μg, more preferably from 1 μg to 50 pq per 1 $m^2$ of the area of the substrate. It is difficult to uniquely define a preferred application amount of the sol particle liquid because the amount is related to, for example, the concentration and application system of the liquid. However, the liquid is preferably applied so as to be as thin a layer as possible in consideration of productivity. When the application amount is excessively large, for example, the liquid is mere likely to be dried in a drying furnace before its solvent volatilizes. Thus, before the nano-pulverized sol particles are sedimented and deposited in the solvent to form the pore structure, the solvent may be dried to inhibit the formation of the pores, thereby largely reducing the porosity of the low-refractive index layer. Meanwhile, when the application amount is excessively small, the following risk may be higher: application repelling occurs owing to, for example, the unevenness of the substrate, or a variation in hydrophilicity or hydrophobicity thereof.

Further, the method of forming the low-refractive index layer includes, for example, the precursor-forming step of forming the pore structure that is the precursor of the pore layer (low-refractive index layer) on the substrate as described above. Although the precursor-forming step is not particularly limited, the precursor (pore layer) may foe formed by, for example, the drying step of drying a coating film produced by applying the microporous particle-containing liquid. Through a drying treatment in the drying step, for example, the solvent in the coating film (solvent in the sol particle liquid) is removed. In addition, the sol particles can be sedimented and deposited to form the pore structure during the drying treatment. The temperature of the drying treatment is, for example, from 50° C. to 250° C., preferably from 60° C. to 150° C., more preferably from 70° C. to 130° C. The time period of the drying treatment is, for example, from 0.1 minute to 30 minutes, preferably from 0.2 minute to 10 minutes, more preferably from 0.3 minute to 3 minutes. The temperature and time period of the drying treatment are preferably lower and shorter in relation to, for example, continuous productivity and the expression of a high porosity. When the conditions are excessively severe, in, for example, the case where the liquid is applied to the resin film, there is a risk in that the temperature approaches the glass transition temperature of the resin film to elongate the resin film in a drying furnace, and hence a defect such as a crack occurs in the formed pore structure immediately after the application. Meanwhile, when the conditions are excessively mild, the precursor contains the residual solvent at, for example, the timing at which the precursor leaves the drying furnace, and hence an inconvenience in terms of appearance, such as the occurrence of a scratch flaw, may occur at the time of the rubbing of the precursor with a roll in the next step.

For example, the drying treatment may be natural drying, may be neat drying, or may be drying under reduced pressure. Of those, the heat drying is preferably used when continuous production of the precursor on an industrial scale is presupposed. A method for the heat drying is not particularly limited, and for example, general heating means may be used. Examples of the heating means include a hot-air dryer, a heating roll, and a far-infrared heater. In addition, a solvent having a low surface tension is preferred as the solvent to be used for the purpose of suppressing the occurrence of a shrinkage stress along with the volatilization of the solvent at the time of the drying and the cracking phenomenon of the porous layer (silicone porous body) due to the stress. Examples of the solvent include a lower alcohol typified by isopropyl alcohol (IPA), hexane, and perfluorohexane. In addition, a small amount of a perfluoro-based surfactant or a silicone-based surfactant may be added to IPA or the like described above to reduce its surface tension.

Further, as described above, the method of forming the low-refractive index layer includes the cross-linking reaction step of causing the cross-linking reaction inside the precursor after the precursor-forming step. The basic substance is generated by light irradiation or heating in the cross-linking reaction step, and the cross-linking reaction step is performed in a plurality of stages. At the first stage of the cross-linking reaction step, for example, the microporous particles are chemically bonded to each other through the action of the catalyst (basic substance). Thus, for example, the three-dimensional structures of the pulverized products in the coating film (precursor) are fixed. When the fixation is performed by conventional sintering, for example, a treatment at a temperature as high as 200° C. or more is performed to induce the dehydration condensation of silanol groups and the formation of a siloxane bond. In the formation method, when any one of various additives that catalyze the dehydration condensation reaction is caused to react with the silanol groups, the porous structure may foe continuously formed and fixed at a relatively low drying temperature around 100° C. and in a treatment time period as short as less than several minutes without the occurrence of any damage to, for example, the substrate (resin film).

A method for the chemical bonding is not particularly limited, and may be appropriately determined in accordance with, for example, the hind of the gel-like silicon compound. As a specific example, the chemical bonding may be performed by, for example, a chemical cross-linking bond between the pulverized products. In addition to the foregoing, for example, when inorganic particles each formed of titanium oxide or the like are added to the pulverized products, it is conceivable that the inorganic particles and the pulverized products are chemically bonded to each ether by a cress-linking bond. In addition, also when the pulverized products are caused to carry a biocatalyst, such as an enzyme, a site different from a catalytic active site of the catalyst and the pulverized products may be chemically bonded to each other by a cross-linking bond. Therefore, the development of the application of the method of forming the low-refractive index layer not only to, for example, the porous layer (silicone porous body) formed of the sol particles but also to an organic-inorganic hybrid porous layer, a host-quest porous layer, or the like is conceivable.

What stage in the method of forming the low-refractive index layer the chemical reaction in the presence of the catalyst is performed (occurs) at is not particularly limited, and the reaction is performed at, for example, at least one stage in the multi-stage cross-linking reaction step. For example, in the method of forming the low-refractive index layer, as described above, the drying step may also serve as the precursor-forming step. In addition, for example, the following may be performed: the multi-stage cross-linking reaction step is performed after the drying step, and the microporous particles are chemically bonded to each other through the action of the catalyst at at least one stage of the step. For example, when the catalyst, is a photoactive catalyst as described above, in the cross-linking reaction step, the microporous particles may be chemically bonded to each other by light irradiation to form the precursor of the porous body. In addition, when the catalyst is a thermally active catalyst, in the cross-linking reaction step, the microporous particles may be chemically bonded to each other by heating to form the precursor of the porous body.

The above-mentioned chemical reaction may be performed by, for example, subjecting the coating film containing the catalyst added to the sol particle liquid (e.g., a suspension) in advance to light irradiation or heating, subjecting the coating film to light irradiation or heating after blowing the catalyst onto the film, or subjecting the coating film to light irradiation or heating while blowing the catalyst onto the film. An integrated light quantity in the light irradiation is not particularly limited, and is, for example, from 200 mJ/cm² to 800 mJ/cm², preferably from 250 mJ/cm² to 600 mJ/cm², more preferably from 300 mJ/cm² to 400 mJ/cm² in terms of a wavelength of 360 ran. An integrated light quantity of 200 mJ/cm² or more is preferred from the viewpoint of preventing the following: the irradiance is not sufficient, and hence the decomposition of the catalyst by its light absorption does not advance, thereby resulting in an insufficient effect. In addition, an integrated light quantity of 800 mJ/cm² or less is preferred from the viewpoint of preventing the occurrence of a thermal wrinkle due to the application of damage to the substrate under the porous layer. Conditions for the heating treatment are not particularly limited. A heating temperature is, for example, from 50° C. to 250° C., preferably from 60° C. to 150° C., more preferably from 70° C. to 130° C. A heating time is, for example, from 0.1 minute to 30 minutes, preferably from 0.2 minute to 10 minutes, more preferably from 0.3 minute to 3 minutes. Alternatively, the step of drying the sol particle liquid (e.g., a suspension) applied as described above may also serve as the step of performing the chemical reaction in the presence of the catalyst. That is, in the step of drying the applied sol particle liquid (e.g., a suspension), the pulverized products (microporous particles) may be chemically bonded to each other by the chemical reaction in the presence of the catalyst. In this case, the pulverized products (microporous particles) may be further strongly bonded to each other by further heating the coating film after the drying step. Further, it is assumed that, the chemical reaction in the presence of the catalyst may occur even in each of the step of producing the microporous particle-containing liquid (e.g., a suspension) and the step of applying the microporous particle-containing liquid. However, the assumption does not limit the method of forming the low-refractive index layer. In addition, a solvent having a low surface tension is preferred: as the solvent to be used, for the purpose of, for example, suppressing the occurrence of a shrinkage stress along with the volatilization of the solvent at the time of the drying and the cracking phenomenon of the porous layer due to the stress. Examples thereof include a lower alcohol typified by isopropyl alcohol (IRA), hexane, and perfluorohexane.

In the method of forming the low-refractive index layer, the cross-linking reaction step is performed in a plurality of stages, and hence the strength of the porous layer (low-refractive index layer) can be further improved as compared to, for example, that in the case where the cross-linking reaction step is performed in one stage. A step corresponding to the second and subsequent stages of the cross-linking reaction step is hereinafter sometimes referred to as "aging step". In the aging step, the cross-linking reaction may be further accelerated inside the precursor by, for example, heating the precursor. Although a phenomenon occurring in the cross-linking reaction step and a mechanism therefor are unclear, the phenomenon and the mechanism are, for example, as described above. In, for example, the aging step, when a heating temperature is set to a low value to cause the cross-linking reaction while suppressing the shrinkage of the precursor, the strength is improved, and hence both of a high porosity and the strength can be achieved. The temperature in the aging step is, for example, from 40° C. to 70° C., preferably from 45° C. to 65° C., more preferably from 50° C. to 60° C. The time period for which the aging step is performed is, for example, from 10 hr to 30 hr, preferably from 13 hr to 25 hr, more preferably from 15 hr to 20 hr.

The low-refractive index layer formed as described above is excellent in strength. Accordingly, the layer may be turned into, for example, a roll-shaped porous body, and hence provides such advantages as follows: the production efficiency of the layer is satisfactory; and the layer is easy to handle.

The low-refractive index layer (porous layer) thus formed may be turned into a laminated structural, body including a porous structure by, for example, further laminating the layer together with any other film (layer). In this case, the respective constituents in the laminated structural body may be laminated via, for example, a pressure-sensitive adhesive or an adhesive. The lamination of the respective constituents may be performed by, for example, a continuous treatment (e.g., a so-called roll-to-roll process) involving using an elongate film because of its efficiency, and when the substrate is a formed product, an element, or the like, the constituents may be subjected to a batch treatment before being laminated.

D. First Pressure-Sensitive Adhesive Layer

The first pressure-sensitive adhesive layer 31 has such hardness that under a normal state, a pressure-sensitive adhesive for forming the first pressure-sensitive adhesive layer-does not permeate the pores of the low-refractive index layer. The storage modulus of elasticity of the first pressure-sensitive adhesive layer is from $1.3 \times 10^5$ (Fa) to $1.0 \times 10^7$ (Pa) as described above, and is preferably from $1.3 \times 10^5$ (Pa) to $1.0 \times 10^5$ (Pa), more preferably from $1.5 \times 10^5$ (Pa) to $5.0 \times 10^5$ (Pa).

Any appropriate pressure-sensitive adhesive may be used as the pressure-sensitive adhesive for forming the first pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition typically contains a (meth)acrylic polymer as a main component (base polymer). The (meth) acrylic polymer may be incorporated into the pressure-sensitive adhesive composition at a ratio of, for example, 50 wt % or more, preferably 70 wt % or more, more preferably 90 wt % or more in the solid content of the pressure-sensitive adhesive composition. The (meth)acrylic polymer contains, as a main component, an alkyl (meth)acrylate serving as a monomer unit. The term "(meth)acrylate" refers to an acrylate and/or a methacrylate. The alkyl group of the alkyl (meth) acrylate is, for example, a linear or branched alkyl group having 1 to 18 carbon atoms. The average number of carbon atoms of the alkyl group is preferably from 3 to 9. As a monomer for forming the (meth)acrylic polymer, in addition to the alkyl (meth)acrylate, there are given comonomers, such as a carboxyl group-containing monomer, a hydroxyl group-containing monomer, an amide group-containing monomer, an aromatic ring-containing (meth)acrylate, and a heterocycle-containing (meth)acrylate. The comonomer is preferably a hydroxyl group-containing monomer and/or a heterocycle-containing (meth)acrylate, more preferably N-acryloylmorpholine. The acrylic pressure-sensitive adhesive composition may preferably contain a silane coupling agent and/or a cross-linking agent. The silane coupling agent is, for example, an epoxy group-containing silane coupling agent. The cross-linking agent is, for example, an isocyanate-based cross-linking agent or a peroxide-based cross-linking agent. Details about such pressure-sensitive adhesive layer or acrylic pressure-sensitive adhesive composition are described in, for example, JP 4140736 B2, the description of which is incorporated herein by reference.

The thickness of the first pressure-sensitive adhesive layer is preferably from 3 μm to 30 μm, more preferably from 0.5

μm to 10 μm. When the thickness of the first pressure-sensitive adhesive layer falls within such ranges, the following advantage is obtained: an influence of the thickness of the pressure-sensitive adhesive layer on the entire thickness of the optical laminate is small while the layer has a sufficient adhesive strength.

E. Second Pressure-Sensitive Adhesive Layer

The second pressure-sensitive adhesive layer 32 includes a pressure-sensitive adhesive having such softness that the layer can serve as an outermost layer to alleviate strain at the time of the vacuum lamination, thereby being capable of suppressing the damage from being occurred to the low-refractive index layer. The storage modulus of elasticity of the second pressure-sensitive adhesive layer is from $1.0 \times 10^5$ (Pa) or less as described above, and is preferably from $5.0 \times 10^3$ (Pa) to $9.0 \times 10^4$ (Pa) or less, more preferably from $1.0 \times 10^4$ (Pa) to $8.5 \times 10^4$ (Pa).

Any appropriate pressure-sensitive adhesive may be used as the pressure-sensitive adhesive for forming the second pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition is as described in the section D. However, the pressure-sensitive adhesive for forming the second pressure-sensitive adhesive layer is preferably free of a heterocycle-containing (meth)acrylate as a comonomer. In addition, the weight-average molecular weight Mw of a base polymer in the pressure-sensitive adhesive composition is preferably 2,000,000 or less, more preferably from 5,000 to 1,600,000. Details about the second pressure-sensitive adhesive layer or the acrylic pressure-sensitive adhesive composition for forming the second pressure-sensitive adhesive layer are described in, for example, JP 2016-190996 A, the description of which is incorporated herein by reference.

The thickness of the second pressure-sensitive adhesive layer is preferably from 5 μm to 200 μm, more preferably from 10 μm to 150 μm. When the thickness of the second pressure-sensitive adhesive layer falls within such ranges, the foaming of the layer derived from its pressure-sensitive adhesive at the time of the vacuum lamination can be suppressed while strain applied to the low-refractive index layer at the time of the vacuum lamination is alleviated.

F. Third Pressure-Sensitive Adhesive Layer

As described above, the third pressure-sensitive adhesive layer 33 may include a soft pressure-sensitive adhesive having a storage modulus of elasticity of $1.0 \times 10^5$ (Pa) or less, or may include a hard pressure-sensitive adhesive having a storage modulus of elasticity of $1.3 \times 10^5$ (Pa) or more. When the third pressure-sensitive adhesive layer includes the soft pressure-sensitive adhesive, the pressure-sensitive adhesive is as described in the section E as the pressure-sensitive adhesive for forming the second pressure-sensitive adhesive layer. When the third pressure-sensitive adhesive layer includes the hard pressure-sensitive adhesive, the pressure-sensitive adhesive is as described in the section D as the pressure-sensitive adhesive for forming the first pressure-sensitive adhesive layer. The thickness of the third pressure-sensitive adhesive layer corresponds to the hardness of the pressure-sensitive adhesive. When the pressure-sensitive adhesive is soft, the thickness is as described in the section E, and when the pressure-sensitive adhesive is hard, the thickness is as described in the section D.

G. Protective Layer

The protective layer 40 may typically include a resin film or a thin resin layer that may have an appropriate strain-alleviating property. A resin for forming the resin film is, for example, an ester-based resin, such as a polyethylene terephthalate-based resin, a cycloolefin-based resin, such as a norbornene-based resin, an olefin-based resin, such as polypropylene, a polycarbonate-based resin, a cellulose-based resin, such as triacetylcellulose (TAC), a polyamide-based resin, a polyimide-based resin, a polyvinyl alcohol-based, resin, a polyether sulfone-based resin, a polysulfone-based resin, a polystyrene-based resin, or a (meth)acrylic resin. Those resins may be used alone or in combination thereof (e.g., copolymerization or blending). The thin resin layer is, for example, an acrylic curing resin, an epoxy-based curing resin, a silicone-based curing resin, or a vinylene-thiol-based curing resin that is cured with UV light or neat. The protective layer only needs to act as a protective layer, and may further have a strain-alleviating property by itself.

The thickness of the protective layer is preferably 100 μm or less, more preferably from 5 μm to 80 μm, stiil more preferably from 10 μm to 60 μm. When the thickness of the protective layer falls within such ranges, coupled with the above-mentioned mechanical characteristics, the layer can express a more appropriate strain-alleviating property.

EXAMPLES

Now, the present invention is specifically described by way of Examples. However, the present invention is not limited to these Examples. Methods of measuring the respective characteristics are as described below.

(I) Refractive Index of Low-Refractive Index Layer

After a law-refractive index layer had been formed on an acrylic film, the resultant was cut into a size measuring 50 mm by 50 mm, and the piece was bonded to the front surface of a glass plate (thickness: 3 mm) via a pressure-sensitive adhesive layer. A central portion (having a diameter of about 20 mm) on the rear surface of the glass plate was daubed with a black marker pen. Thus, a sample in which light was not reflected on the rear surface of the glass plate was obtained. The sample was set in an ellipsometer (manufactured by J. A. Woollam Japan: VASE), and its refractive index was measured under the conditions of a wavelength of 500 nm and an incident angle of from 50° to 80%.

(II) Damage to Low-Refractive Index Layer

A light guide plate having a thickness of 400 μm and a liquid crystal image display panel were bonded to each other via an optical laminate with pressure-sensitive adhesive layers on both surfaces obtained in each of Examples and Comparative Examples by a vacuum lamination process. The state of the low-refractive index layer of the optical laminate with pressure-sensitive adhesive layers on both surfaces after the bonding was visually observed, and the presence or absence of damage was examined. Further, the image display panel having bonded thereto the light guide plate was caused to display a black image on its entire screen, and the presence or absence of light leakage from the screen was visually observed.

(III) Air Bubbles

The presence or absence of air bubbles in the laminate of the image display panel and the light guide plate obtained in the same manner as in the section (II) was visually observed.

(IV) Light Utilization Efficiency

The image display panel having bonded thereto the light guide plate in the same manner as in the section (II) was caused to display a white image on its entire screen, and the brightness of the image was visually observed.

[Production Example 1] Preparation of Application Liquid for Forming Low-Refractive Index Layer (1) Gelation of Silicon Compound 0.95 g of methyltrimethoxysilane (MTMS) that was a precursor of a silicon compound was dissolved in 2.2 g of dimethyl sulfoxide (DMSO). Thus, a mixed liquid A was prepared. 0.5 g of a 0.01 mol/L aqueous solution of oxalic acid was added to the mixed liquid A, and the mixture was stirred at room temperature for 30 minutes so that MTMS was hydrolyzed. Thus, a mixed liquid B containing tris(hydroxy)methylsilane was produced.

0.38 g of 28 wt % ammonia water and 0.2 g of pure water were added to 5.5 g of DMSO, and then the mixed liquid B was further added to the mixture, followed by stirring at room temperature for 15 minutes to perform the gelation of tris(hydroxy)methylsilane. Thus, a mixed liquid C containing a gel-like silicon compound was obtained.

(2) Aging Treatment

An aging treatment was performed by incubating the mixed liquid C containing the gel-like silicon compound, which had been prepared as described above, as it was at 40° C. for 20 hours.

(3) Pulverization Treatment

Next, the gel-like silicon compound subjected to the aging treatment as described above was crushed into granular shapes each having a size of from several millimeters to several centimeters with a spatula. Next, 40 g of isopropyl alcohol (IPA) was added to the mixed liquid C, and the mixture was lightly stirred. After that, the mixture was left at rest at room temperature for 6 hours so that the solvent and the catalyst in the gel were decanted. A similar decantation treatment was performed three times to replace the solvent with IPA. Thus, a mixed liquid D was obtained. Next, the gel-like silicon compound in the mixed liquid D was subjected to a pulverization treatment (high-pressure media-less pulverization). The pulverization treatment (high-pressure media-less; pulverization) was performed as follows: a homogenizer (manufactured by SMT Co., Ltd., product name: "UH-50") was used, and 1.85 g of the gel-like silicon compound and 1.15 g of IPA in the mixed liquid D were weighed in a 5-cubic centimeter screw bottle, followed by the performance of the pulverization of the mixture under the conditions of 50 W and 20 kHz for 2 minutes.

The gel-like silicon compound in the mixed liquid D was pulverized by the pulverization treatment, and hence the mixed liquid D was turned into a sol liquid of the pulverized products. A volume-average particle diameter representing a variation in particle size of the pulverized products in the mixed liquid D was determined to be from 0.50 to 0.70 with a dynamic, light scattering-type nanotrack particle size analyzer (manufactured by Nikkiso Co., Ltd., UPA-EX150). Further, a methyl ethyl ketone (MEK) solution of a photobase generator (Wake Pure Chemical Industries, Ltd.: product name: WPBG-266) having a concentration of 1.5 wt % and a MEK solution of bis(trimethoxysilyl) ethane having a concentration of 5% were added at ratios of 0.062 g and 0.036 g, respectively to 0.75 g of the sol liquid (mixed liquid D). Thus, an application liquid for forming a low-refractive index layer was obtained.

Production Example 2

Preparation of Pressure-Sensitive Adhesive for Forming First Pressure-Sensitive Adhesive Layer 90.7 Parts of butyl acrylate, 6 parts of N-acryloylmorpholine, 3 parts of acrylic acid, 0.3 part of 2-hydroxybutyl acrylate, and 0.1 part of 2,2'-azobisisobutyronitrile serving as a polymerization initiator were loaded into a four-necked flask including a stirring blade, a temperature gauge, a nitrogen gas-introducing tube, and a condenser together with 100 g of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.2 Part of an isocyanate cross-linking agent (CORONATE L manufactured by Nippon Polyurethane Industry Co., Ltd., tolylene diisocyanate adduct of trimethylolpropane), 0.3 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive solution. Next, the acrylic pressure-sensitive adhesive solution was applied to one surface of a silicone-treated polyethylene terephthalate (PET) film (manufactured by Mitsubishi Chemical Polyester Film Co., Ltd., thickness: 38 μm) so that the thickness of a pressure-sensitive adhesive layer after drying became 10 μm, followed by drying at 150° C. for 3 minutes. Thus, the pressure-sensitive adhesive layer was formed. The resultant pressure-sensitive adhesive layer had a storage modulus of elasticity of $1.3 \times 10^5$ (Pa).

Production Example 3

Preparation of Pressure-Sensitive Adhesive for Forming Second Pressure-Sensitive Adhesive Layer 99 Parts of butyl acrylate, 1 part, of 4-hydroxybutyl acrylate, and 0.1 part of 2,2'-azobisisobutyronitrile serving as a polymerization initiator were loaded into a four-necked flask; including a stirring blade, a temperature gauge, a nitrogen gas-introducing tube, and a condenser together with 100 parts of ethyl acetate, and a nitrogen gas was introduced to purge the flask; with nitrogen while the mixture was gently stirred. After that, a liquid temperature in the flask; was kept at around 55° C., and a polymerization reaction was performed for 8 hours to prepare an acrylic polymer solution. 0.1 Part of an isocyanate cross-linking agent (TAKENATE D110N manufactured by Mitsui Takeda Chemicals Inc., trimethylolpropane xylylene diisocyanate), 0.1 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content, of the resultant acrylic polymer solution to prepare an acrylic pressure-sensitive adhesive composition solution. Next, the acrylic pressure-sensitive adhesive composition solution was applied to one surface of a polyethylene terephthalate film treated with a silicone-based releasing agent (separator film: manufactured by Mitsubishi Chemical Polyester Film Co., Ltd., MRF 38), and was dried at 150° C. for 3 minutes to form a pressure-sensitive adhesive layer having a thickness of 20 μm on the surface of the separator film. The resultant pressure-sensitive adhesive layer had a storage modulus of elasticity of $8.2 \times 10^4$ (Pa).

Example 1

The application liquid for forming a low-refractive index layer prepared in Production Example 1 was applied to a substrate (acrylic film) having a thickness of 20 μm. The wet thickness (thickness before drying) of the coating layer was about 27 μm. The coating layer was treated at a temperature of 100° C. for 1 minute to be dried. Thus, a low-refractive index layer (thickness: 0.9 μm) was formed on the substrate. The resultant low-refractive index layer had a porosity of 56% and a refractive index of 1.15. Next, a first pressure-sensitive adhesive layer (thickness: 10 μm) including the pressure-sensitive adhesive prepared in Production Example 2 was formed, on the surface of the low-refractive index layer, and a protective layer (acrylic resin film, thickness: 20 μm) was further arranged on the first pressure-sensitive adhesive layer, followed by the formation of a second pressure-sensitive adhesive layer (thickness: 20 μm) including the pressure-sensitive adhesive prepared in Production Example 3 on the surface of the protective layer. Meanwhile, a third pressure-sensitive adhesive layer (thickness: 28 μm) including the pressure-sensitive adhesive prepared in Production Example 3 was formed on the surface of the substrate. Thus, an optical laminate with pressure-sensitive adhesive layers on both surfaces, which had the configuration "second pressure-sensitive adhesive layer (low storage modulus of elasticity)/protective layer/first pressure-sensitive adhesive layer (high storage modulus of elasticity)/low-refractive index layer/substrate/third pressure-sensitive adhesive layer (low storage modulus of elasticity)," was produced. The resultant, optical laminate with pressure-sensitive adhesive layers on both surfaces was subjected to the evaluations (II) to (IV). The results are shown in Table 1.

Example 2

An optical laminate with pressure-sensitive adhesive layers on both, surfaces, which had the configuration "second pressure-sensitive adhesive layer (low storage modulus of elasticity)/protective layer/first pressure-sensitive adhesive layer (high storage modulus of elasticity)/low-refractive index layer/substrate/third pres sure-sensitive adhesive layer (high storage modulus of elasticity)," was produced in the same manner as in Example 1 except that the third pressure-sensitive adhesive layer was formed by using the pressure-sensitive adhesive prepared in Production Example 2 instead of the pressure-sensitive adhesive prepared in Production Example 3. The resultant optical laminate with pressure-sensitive adhesive layers on both surfaces was subjected to the same evaluations as those of Example 1. The results are shown in Table 1.

Example 3

A laminate having the configuration "substrate/low-retractive index layer/first pressure-sensitive adhesive layer" was produced in the same manner as in Example 1. Next, a second pressure-sensitive adhesive layer including the pressure-sensitive adhesive prepared in Production Example 3 was formed on the surface of the substrate. Thus, an optical laminate with pressure-sensitive adhesive layers on both surfaces, which had the configuration "second pressure-sensitive adhesive layer (low storage modulus of elasticity)/substrate/low-refractive index layer/first pressure-sensitive adhesive layer (high storage modulus of elasticity)," was produced. The resultant optical laminate with pressure-sensitive adhesive layers on both surfaces was subjected to the same evaluations as those of Example 1. The results are shown in Table 1.

Comparative Example 1

An optical laminate with pressure-sensitive adhesive layers on both surfaces, which had the configuration "second pressure-sensitive adhesive layer (high storage modulus of elasticity)/substrate/low-refractive index layer/first pressure-sensitive adhesive layer (high storage modulus of elasticity)," was produced in the same manner as in Example 3 except, that the second pressure-sensitive adhesive layer was formed by using the pressure-sensitive adhesive prepared in Production Example 2 instead of the pressure-sensitive adhesive prepared in Production Example 3. The resultant optical laminate with pressure-sensitive adhesive layers on both surfaces was subjected to the same evaluations as those of Example 1. The results are shown in Table 1.

Comparative Example 2

An optical laminate with pressure-sensitive adhesive layers on both surfaces, which had the configuration "second pressure-sensitive adhesive layer (low storage modulus of elasticity)/protective layer/first pressure-sensitive adhesive layer (low storage modulus of elasticity)/low-refractive index layer/substrate/third pressure-sensitive adhesive layer (low storage modulus of elasticity)," was produced in the same manner as in Example 1 except that the first pressure-sensitive adhesive layer was formed by using the pressure-sensitive adhesive prepared in Production Example 3 instead of the pressure-sensitive adhesive prepared in Production Example 2. The resultant optical laminate with pressure-sensitive adhesive layers on both surfaces was subjected to the same evaluations as those of Example 1. The results are shown in Table 1.

Reference Example 1

An optical laminate with pressure-sensitive adhesive layers on both surfaces, which had the configuration "second pressure-sensitive adhesive layer (low storage modulus of elasticity)/protective layer/first pressure-sensitive adhesive layer (high storage modulus of elasticity)/low-refractive index layer/substrate/third pressure-sensitive adhesive layer (low storage modulus of elasticity)," was produced in the same manner as in Example 1 except that the low-refractive index layer was formed from a fluoro group-containing resin having a refractive index of 1.34 (manufactured by Asahi Glass Co., Ltd., product, name: "CYTOP", porosity: 0%). The resultant optical laminate with pressure-sensitive adhesive layers on both surfaces was subjected to the same evaluations as those of Example 1. The results are shown in Table 1.

TABLE 1

| | Damage to low-refractive index layer | | | Light utilization |
|---|---|---|---|---|
| | Visual observation | Light leakage | Air bubbles | efficiency (brightness) |
| Example 1 | Damage is absent | Absent | Absent | ○ (Good) |
| Example 2 | Damage is absent | Absent | Absent | ○ (Good) |
| Example 3 | Damage is absent | Absent | Some air bubbles are present | ○ (Good) |
| Comparative Example 1 | Damage is present | Present | Some air bubbles are present | × (No good) |
| Comparative Example 2 | Damage is absent | Absent | Absent | × (No good) |

TABLE 1-continued

| | Damage to low-refractive index layer | | | Light utilization |
| --- | --- | --- | --- | --- |
| | Visual observation | Light leakage | Air bubbles | efficiency (brightness) |
| Reference Example 1 | Damage is absent | Absent | Absent | × (No good) |

As is apparent from Table 1, according to Examples of the present invention, the damage to the low-refractive index layer having a high porosity in the vacuum lamination can be suppressed. In addition, as is apparent from comparison between Examples 1 and 2, and Example 3, the arrangement of the protective layer makes the effects of the present invention more significant. Further, as is apparent from Comparative Example 2, when the pressure-sensitive adhesive layer that has a low storage modulus of elasticity (is soft) is used as the first pressure-sensitive adhesive layer adjacent to the low-refractive index layer, the function of the low-refractive index layer becomes insufficient. In addition, as is apparent from Reference Example 1, the damage to the low-refractive index layer is a problem specific to the low-refractive index layer having a high porosity.

INDUSTRIAL APPLICABILITY

The optical laminate with pressure-sensitive adhesive layers on both surfaces of the present invention is suitably used in the lamination of various optical members (e.g., the lamination of a light guide; plate and a peripheral member), and may be suitably used particularly in lamination requiring vacuum lamination.

REFERENCE SIGNS LIST 10 substrate
20 low-refractive index layer
31 first pressure-sensitive adhesive layer
32 second pressure-sensitive adhesive layer
33 third pressure-sensitive adhesive layer
40 protective layer
100 optical laminate with pressure-sensitive adhesive layers on both surfaces
101 optical laminate with pressure-sensitive adhesive layers on both surfaces

The invention claimed is:

1. An optical laminate with pressure-sensitive adhesive layers, comprising:
   a substrate;
   a low-refractive index layer formed on the substrate;
   a first pressure-sensitive adhesive layer arranged so as to be adjacent to the low-refractive index layer; and
   a second pressure-sensitive adhesive layer serving as one outermost layer,
   wherein the low-refractive index layer has a porosity of 50% or more and 90% or less, and a refractive index of from 1.01 to 1.30
   wherein the first pressure-sensitive adhesive layer has a storage modulus of elasticity of from $1.3 \times 10^5$ (Pa) to $1.0 \times 10^7$ (Pa), and
   wherein the second pressure-sensitive adhesive layer has a storage modulus of elasticity of $1.0 \times 10^5$ (Pa) or less.

2. The optical laminate with the pressure-sensitive adhesive layers according to claim 1, wherein the second pressure-sensitive adhesive layer is arranged on a side of the substrate opposite to the low-refractive index layer so that the first pressure-sensitive adhesive layer and the second pressure-sensitive adhesive layer serve as outermost layers.

3. The optical laminate with the pressure-sensitive adhesive layers according to claim 1, further comprising a third pressure-sensitive adhesive layer, wherein the second pressure-sensitive adhesive layer is arranged on a side of the first pressure-sensitive adhesive layer, and the third pressure-sensitive adhesive layer is arranged on a side of the substrate opposite to the low-refractive index layer so that the second pressure-sensitive adhesive layer and the third pressure-sensitive adhesive layer serve as outermost layers.

4. The optical laminate with the pressure-sensitive adhesive layers according to claim 3, wherein the third pressure-sensitive adhesive layer has a storage modulus of elasticity of $1.0 \times 10^5$ (Pa) or less.

5. The optical laminate with the pressure-sensitive adhesive layers according to claim 3, wherein the third pressure-sensitive adhesive layer has a storage modulus of elasticity of $1.3 \times 10^5$ (Pa) or more.

* * * * *

UNITED STATES PATENT AND TRADEMARK OFFICE
CERTIFICATE OF CORRECTION

| | |
|---|---|
| PATENT NO. | : 11,891,549 B2 |
| APPLICATION NO. | : 17/276962 |
| DATED | : February 6, 2024 |
| INVENTOR(S) | : Daisuke Hattori et al. |

It is certified that error appears in the above-identified patent and that said Letters Patent is hereby corrected as shown below:

In the Claims

Change Claim 3, Column 30 Line 29 - 31:
pressure-sensitive adhesive layer. wherein the second pressure-sensitive adhesive layer is arranged on a side of the first pressure-sensitive adhesive layer, and the third pressure- To be:
pressure-sensitive adhesive layer, wherein the second pressure-sensitive adhesive layer is arranged on a side of the first pressure-sensitive adhesive layer opposite to the low-refractive index layer, and the third pressure- Signed and Sealed this
Third Day of September, 2024

Katherine Kelly Vidal
*Director of the United States Patent and Trademark Office*